US006624892B1

(12) United States Patent
Johnston

(10) Patent No.: US 6,624,892 B1
(45) Date of Patent: Sep. 23, 2003

(54) METHOD AND APPARATUS FOR FLY HEIGHT TESTING USING LIGHT EMITTING DIODES

(75) Inventor: Matthew M. Johnston, Edina, MN (US)

(73) Assignee: Seagate Technolgy LLC, Scotts Valley, CA (US)

( * ) Notice: Subject to any disclaimer, the term of this patent is extended or adjusted under 35 U.S.C. 154(b) by 0 days.

(21) Appl. No.: 09/833,143

(22) Filed: Apr. 11, 2001

Related U.S. Application Data
(60) Provisional application No. 60/208,875, filed on Jun. 1, 2000.

(51) Int. Cl.[7] .................................................. G01B 9/02
(52) U.S. Cl. ........................................ 356/507; 356/492
(58) Field of Search ................................ 356/492, 507, 356/489, 495; 250/205, 225, 559.38; 360/75

(56) References Cited

U.S. PATENT DOCUMENTS

| | | | | |
|---|---|---|---|---|
| 4,593,368 A | * | 6/1986 | Fridge et al. ................ 356/507 |
| 4,606,638 A | | 8/1986 | Sommargren ................ 356/351 |
| 4,681,447 A | | 7/1987 | Davidson ..................... 356/351 |
| 4,813,782 A | * | 3/1989 | Yagi et al. ................... 356/507 |
| 4,998,043 A | | 3/1991 | Unami et al. ................ 315/151 |
| 5,168,412 A | | 12/1992 | Doan et al. .................. 360/103 |
| 5,218,424 A | * | 6/1993 | Sommargren ................ 356/507 |
| 5,239,178 A | | 8/1993 | Derndinger et al. ......... 250/234 |
| 5,280,340 A | | 1/1994 | Lacey ......................... 356/357 |
| 5,751,427 A | * | 5/1998 | de Groot ..................... 356/507 |

OTHER PUBLICATIONS

"LEDs: From Indicators to Illuminators?, " by Andrew Bierman, downloaded from http://www.lrc.rpi.edu/Ltgtrans/led/leds.htm, 9 pages (1998).
Brochure entitled "Lamp Type LED," Nichia Corporation, 6 pages (May 1999).

* cited by examiner

*Primary Examiner*—Kevin Pyo
(74) *Attorney, Agent, or Firm*—Theodore M. Magee; Westman, Champlin & Kelly, PA

(57) ABSTRACT

A method and fly-height tester include a moving medium and a slider mount that holds a slider in proximity with the medium so that the slider flies relative to the medium. At least one light emitting diode generates a light that is directed by optics so that it reflects off the medium and the slider. The reflected light is directed by second optics to at least one detector, where each detector is capable of generating an electrical signal based on the amplitude of at least one wavelength of light in the reflected light. A distance calculator then determines the distance from the slider to the medium based on the at least one electrical signal.

19 Claims, 5 Drawing Sheets

400 402

602 604 606 600

METHOD AND APPARATUS FOR FLY HEIGHT TESTING USING LIGHT EMITTING DIODES

CROSS-REFERENCE TO RELATED APPLICATION

This application claims priority from U.S. provisional patent application Serial No. 60/208,875, filed Jun. 1, 2000, and entitled "FLY HEIGHT VARIANCE TECHNIQUE FLY HEIGHT TESTING".

FIELD OF THE INVENTION

The present invention relates to fly-height testing in storage devices. In particular, the present invention relates to interferometer fly-height testing.

BACKGROUND OF THE INVENTION

In many storage devices, a slider containing a read or write head flies above a moving medium, such as a disc, in order to read or write data to various parts of the medium. The fly-height of the slider, he distance between the slider's bottom surface and the surface of the medium, affects the head's ability to read and write data to the medium. To ensure that the fly-height of a slider is within specifications, the slider is tested using a fly-height tester before it is placed in a drive.

Most fly-height testers determine the distance between the slider and a test medium using a technique known as interferometry. Under this technique, a beam of light is passed through the medium and onto the slider as the slider flies over the medium. This causes the light to be reflected twice, once at the surface of the medium and once at the slider. These two reflective beams interfere with each other such that some wavelengths of light have a high amplitude in the combined reflected light while other wavelengths of light have zero amplitude. By measuring the intensity of the light at particular wavelengths, it is possible to determine the distance between the slider and the disc surface.

Because the distance measurement is dependent on the amplitude of the reflected light, any noise that affects the amplitude of the reflected light will affect the accuracy of the measurement. In prior art systems, one major source of optic noise has been the light source used to generate the light beam. For example, some testers use arc lamps that produce a noisy light beam due to the manner in which they generate light. Other fly-height testers use lasers that generate a light that is initially relatively clean but that is prone to speckling when it reflects off a surface.

Arc lamps and lasers are also undesirable because they are inefficient and produce a large amount of heat. This adds to the cost of the tester because the tester must be designed to vent the heat.

The present invention provides a solution to this and other problems and offers other advantages over the prior art.

SUMMARY OF THE INVENTION

A method and fly-height tester include a moving medium land a slider mount that holds a slider in proximity with the medium so that the slider flies relative to the medium. At least one light emitting diode generates a light that is directed by optics so that it reflects off the medium and the slider. The reflected light is directed by second optics to at least one detector, where each detector is capable of generating an electrical signal based on the amplitude of at least one wavelength of light in the reflected light. A distance calculator then determines the distance from the slider to the medium based on the at least one electrical signal.

DETAILED DESCRIPTION OF ILLUSTRATIVE EMBODIMENTS

Figure 1:
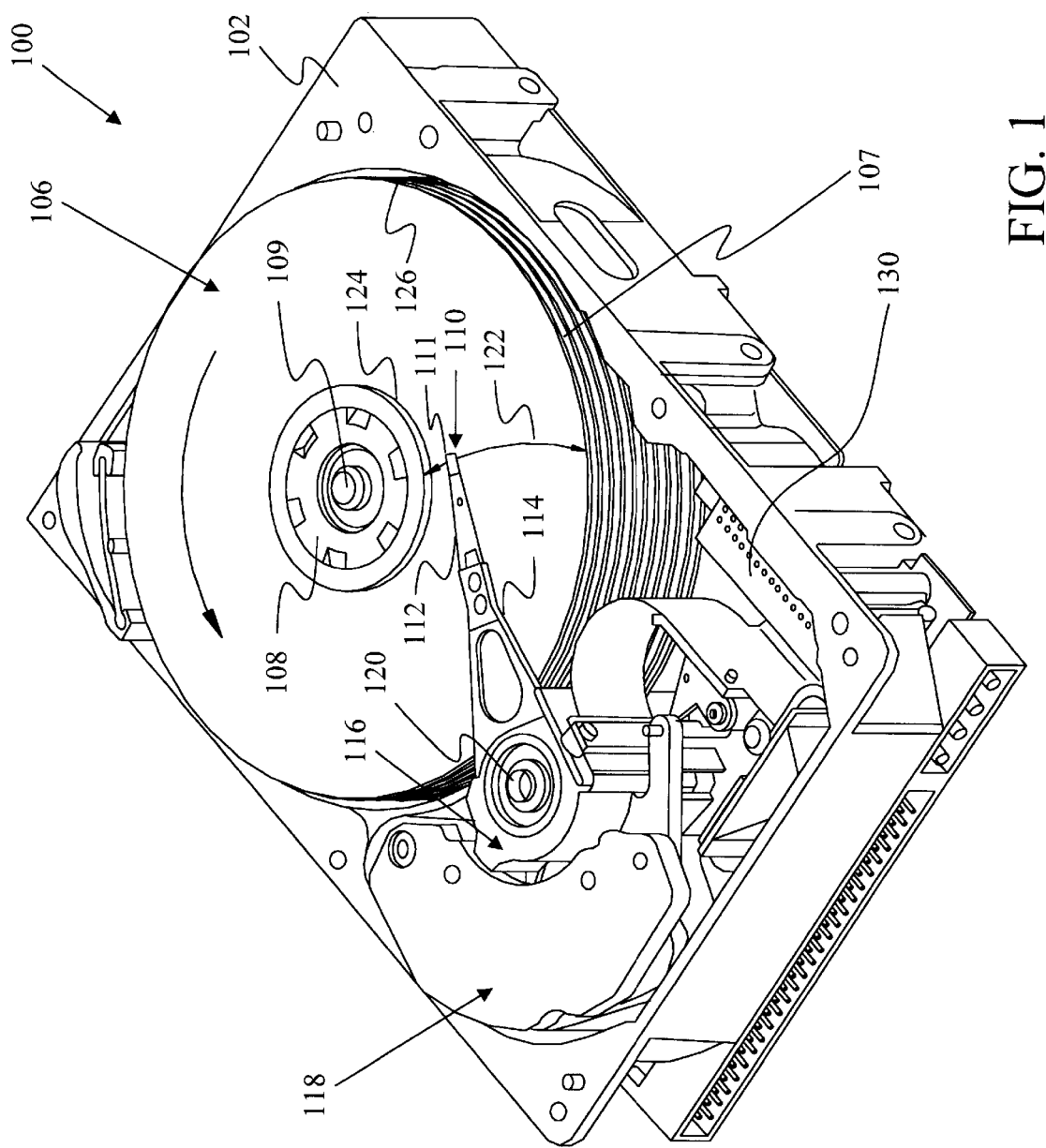
FIG. 1 is block diagram of one embodiment of a storage device under the present invention.

FIG. 1 is a perspective view of a disc drive 100 in which the present invention is useful. Disc drive 100 includes a housing with a base 102 and a top cover (not shown). Disc drive 100 further includes a disc pack 106, which is mounted on a spindle motor (not shown), by a disc clamp 108. Disc pack 106 includes a plurality of individual discs 107, which are mounted for co-rotation about central axis 109. Each disc surface has an associated disc head-slider 110 that is mounted to disc drive 100 for communication with the confronting disc surface. Head-slider 110 includes a slider structure arranged to fly above the associated disc surface of an individual disc of disc pack 106, and a transducing head 111 arranged to write data to, and read data from, concentric tracks on the confronting disc surface. The concentric tracks are, in effect, parallel to each other at different radii on the disc. In the example shown in FIG. 1, head-sliders 110 are supported by suspensions 112 which are in turn attached to track accessing arms 114 of an actuator 116. Actuator 116 is driven by a voice coil motor (VCM) 118 to rotate the actuator, and its attached heads 110, about a pivot shaft 120. Rotation of actuator 116 moves the heads along an arcuate path 122 to position the heads over a desired data track between a disc inner diameter 124 and a disc outer diameter 126. Voice coil motor 118 is driven by servo electronics included on circuit board 130 based on signals generated by the heads of head-sliders 110 and a host computer (not shown). Read and write electronics are also included on circuit board 130 to supply signals to the host computer based on data read from disc it ack 106 by the read heads of head-sliders 110, and to supply write signals too the write head of head-sliders 110 to write data to the discs.

The fly heights of head-sliders 110 are tested before the sliders are placed in a disc drive. Under the present invention, the fly-heights are tested using an interferometer that has an improved light source constructed of light emitting diodes (LEDs).

Figure 2:
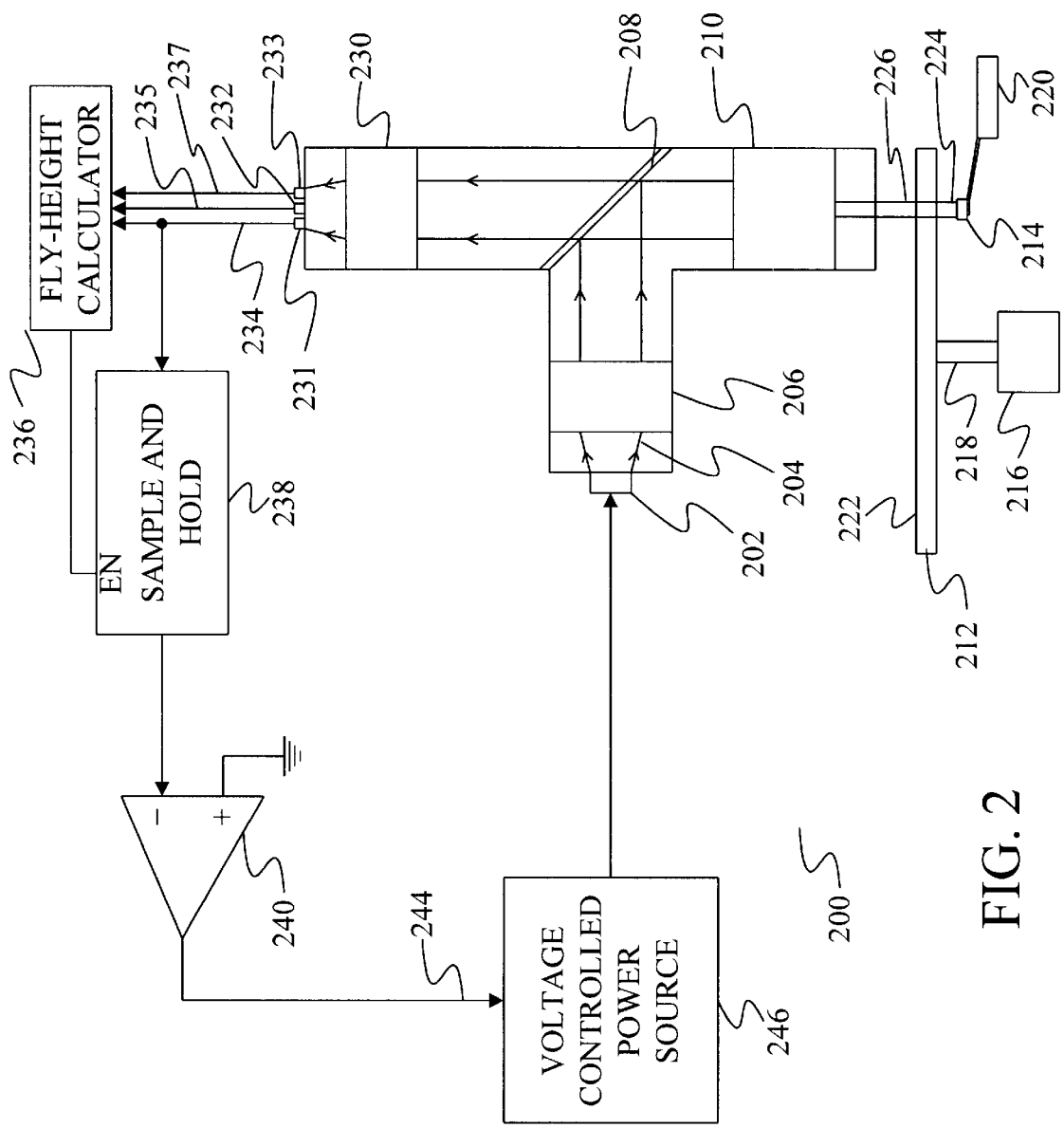
FIG. 2 is a block diagram of a fly-height tester under one embodiment of the present invention.

FIG. 2 provides a block diagram of a fly-height tester 200 of one embodiment of the present invention. Fly height tester 200 includes an LED light source 202 that generates a light 204. The light passes through an optic system 206, where it is collimated into a beam of light that is reflected by a splitter 208 toward a second optic system 210. Optic system 210 directs the beam of light toward a transparent disc 212 and a slider 214. Disc 212 is rotated by a motor 216 and a spindle 218. Slider 214 is mounted in a slider mount 220 that places a positive but resilient force against slider 214 to force it into contact with disc 212. As the disc is rotated by motor 216, an air bearing develops between slider 214 and disc 212 causing slider 214 to fly below disc 212.

The beam of light from optics 210 reflected off surface 222 of disc 212 and the surface of slider 214. This generates reflected light 224 from slider 214 and reflected light 226 from disc 212.

Reflected light 224 and 226 are combined to form a total reflected beam that is formed from the interference between reflected light 224 and reflected light 226. This total reflected beam passes through optics 210 and splitter 208 to optics 230, which direct the reflected beam onto a set of detectors 231, 232, and 233. Each detector generates an electrical signal that has an amplitude that tracks the amplitude of a wavelength of light in the reflected beam. Under most embodiments, detectors 231, 232, and 233 detect different wavelengths of light. The three electrical signals 234, 235, and 237 produced by the detectors are provided to a fly-height calculator 236, which determines the distance between the head 214 and disc 212 based on the amplitude of the signals. Systems for performing such fly-height calculations are well known in the art.

At least one of the electrical signals, such as electrical signal 234, is also provided to a sample and hold 238, which is gated to hold the electrical signal at a constant level during the fly height measurement period. Because it is held constant by the sample and hold 238 during measurement, as the distance between slider 214 and disc 212 changes, the amplitude provided by the sample and hold 238 indicates the intensity of the light provided by LED 202. The gated signal is provided to an inverting amplifier which inverts and amplifies the signal in order to provide negative feedback. During non-measurement periods, the inverting amplifier 240 is able to generate a feedback signal 244 that can be used to control a power source 246 for LED 202. For example, if the amplitude is too high, comparator 240 will generate a feedback signal 244 that will lower the power provided by power source 246. In this manner, feedback signal 244 will reduce the intensity of the light output LED 202. Similarly, if the amplitude provided by sample and hold 238 is too low, comparator 240 will increase feedback signal 244 so that the power provided to LED 202 increases. Thus, the present invention provides a feedback mechanism for stabilizing the intensity of the light provided by LED 202, thereby limiting the noise in the light provided to detectors 231, 232, and 233.

Figure 3:
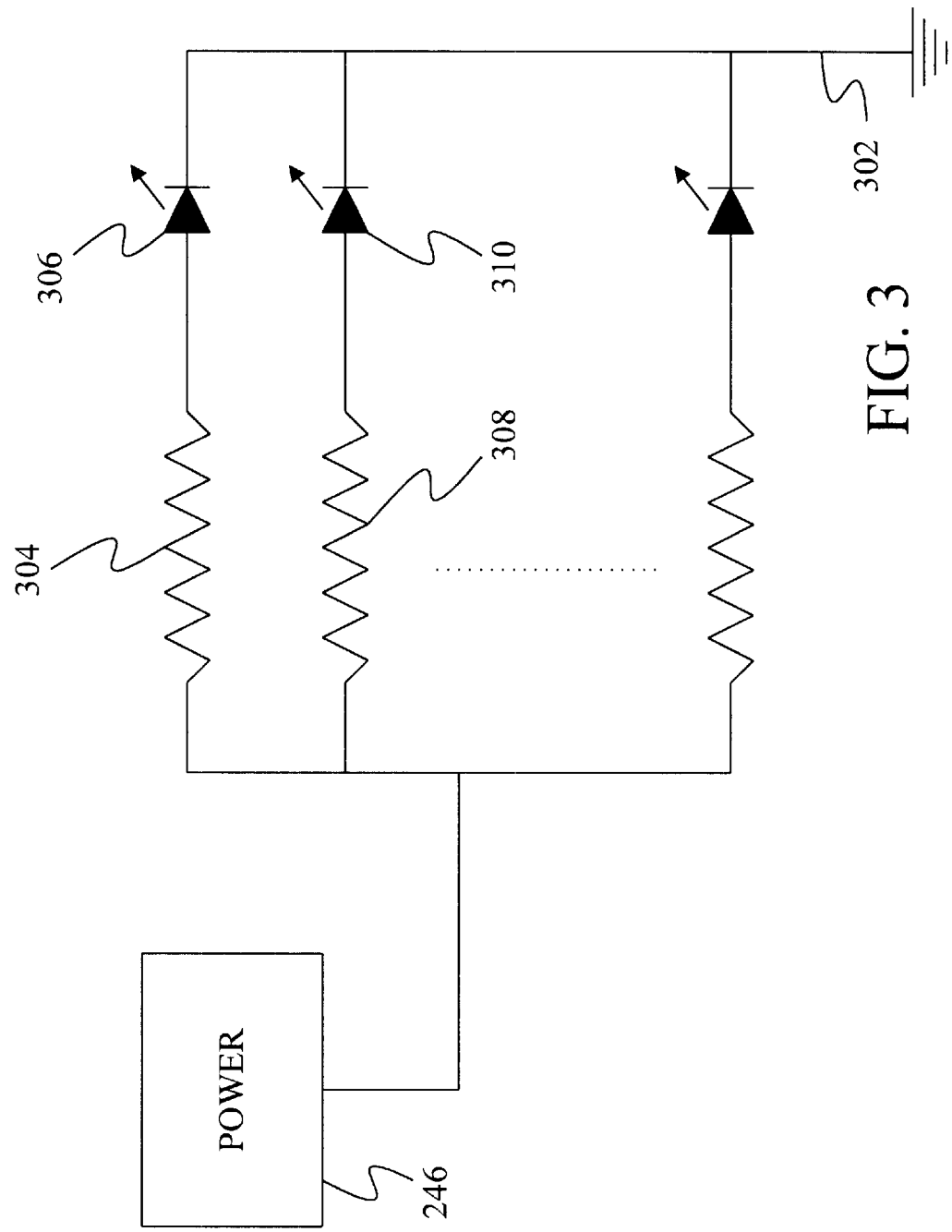
FIG. 3 is a circuit diagram of an LED array under one embodiment of the present invention

Under most embodiments of the invention, LED 202 is an array of LEDs. FIG. 3 provides a circuit diagram for such an array. In FIG. 3, the array is constructed from bias resistors and LEDs that extend in parallel between power supply 246 and a ground 302. For example, bias resistor 304 is in series with LED 306 between power supply 246 and ground 302. Similarly, bias resistor 308 is in series with LED 310 between power supply 246 and ground 302.

The bias resistors of the array, such as bias resistors 304 and 308, are selected based on the voltage provided by power supply 246 and the desired operating current for the LEDs. Under one embodiment, the LEDs are white gallium nitride (GaN) LEDs from Nichia Corporation in Tokushima, Japan having part number NSPW500BS. For such LEDs, power supply 246 typically provides five volts and the LEDs are biased with 200 ohm resistors. The number of LEDs in the array is determined based on the amount of light that is needed for the fly-height testing. Under one embodiment, 300 LEDs are provided in the array.

Although gallium nitride LEDs were used in one embodiment of the present invention, LEDs formed from other materials may be used in the present invention as long as they provide sufficient light for the fly-height testing.

Figure 4:
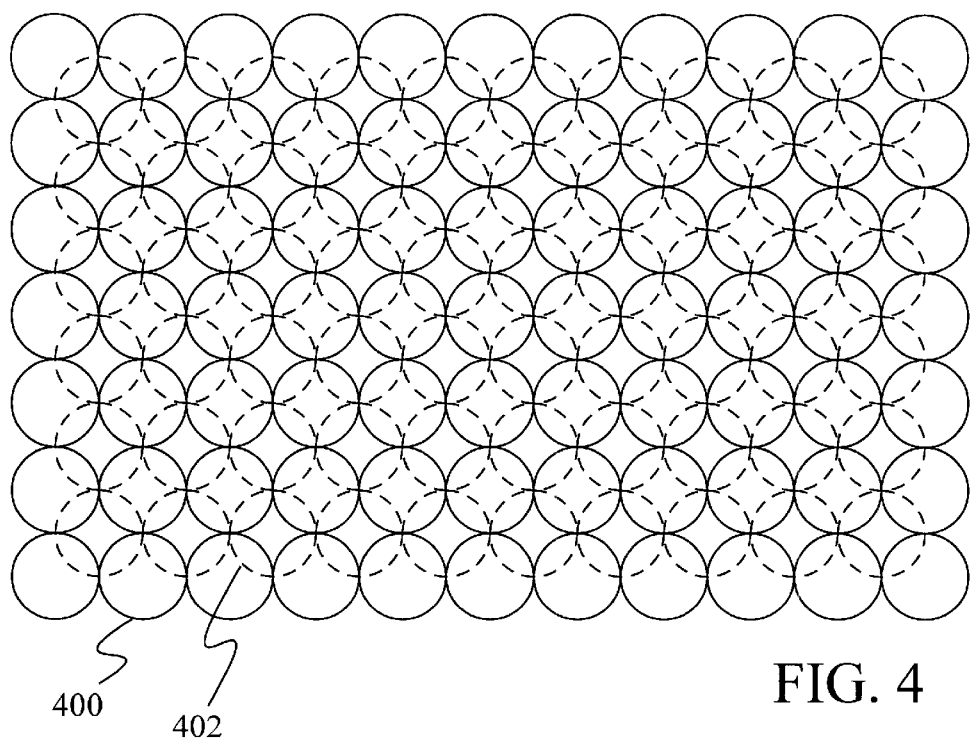
FIG. 4 is a top view of an LED array under one embodiment of the present invention

FIG. 4 provides a top view of a layout for the LEDs in one light source of the present invention. In the embodiment of FIG. 4, the LEDs are stacked in two layers, with the bottom layer being represented by solid circles, such as LED circle 400 and the top layer being represented by dashed circles such as LED circle 402. In this manner, the spaces between the LEDs in the top layer are filled with LEDs from the bottom layer. Note that in the embodiment of FIG. 4, the light from the LED tends to be concentrated in the center of the LED and is highly directional such that the light emitted from the LED would be directed almost entirely out of the page of FIG. 4.

Figure 5:
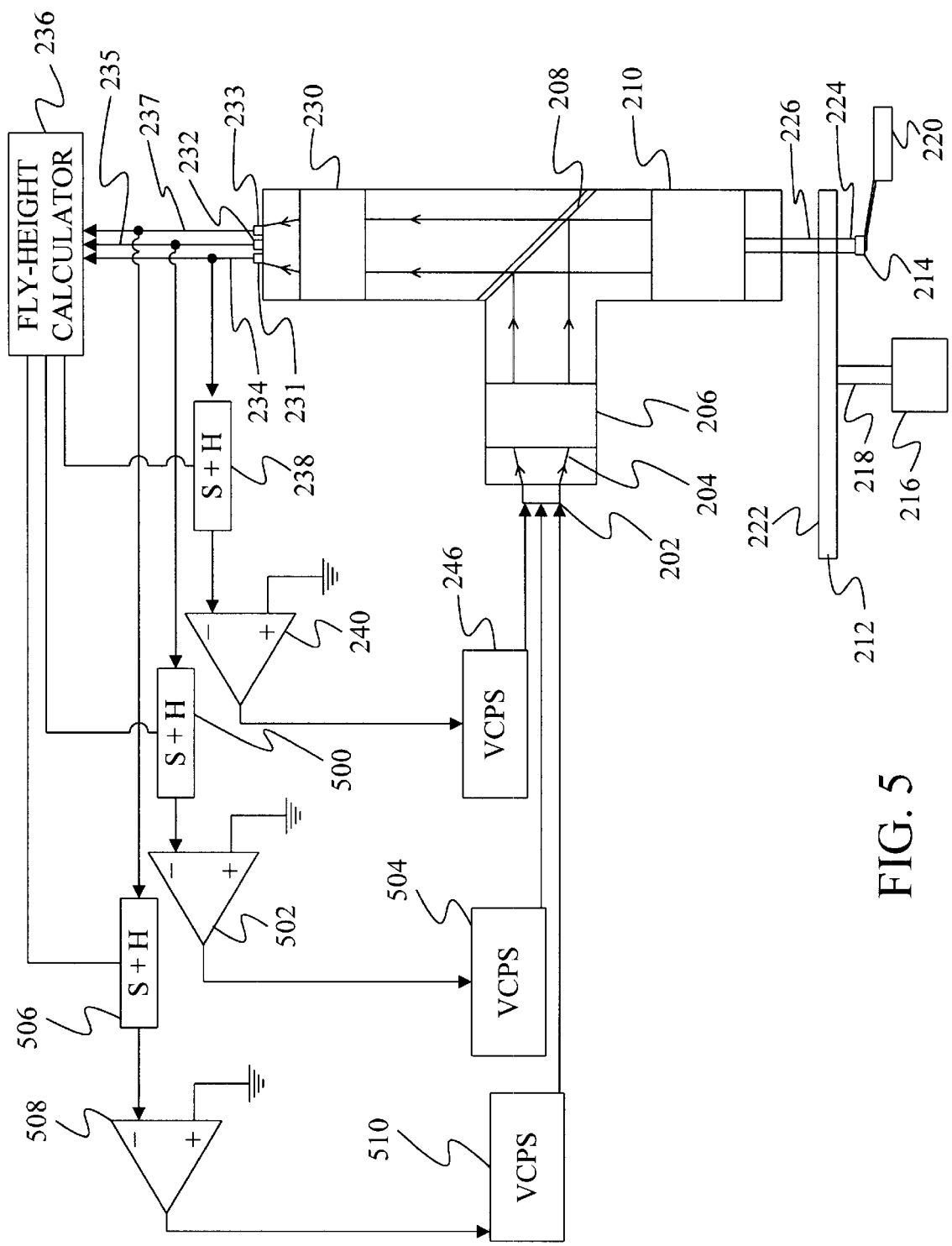
FIG. 5 is a block diagram of a second embodiment of a fly-height tester under the present invention

FIG. 5 provides a block diagram of a second embodiment of the present invention, in which three different colors of LEDs are provided in the LED array, with each color providing a different wavelength of light. In FIG. 5, the elements that are common to FIG. 2 are numbered the same.

In FIG. 5, the different colored light emitting diodes in LED array 202 are each provided with their own feedback stabilization circuit. For example, sample and hold 238, comparator 240, and power supply 246 provide a stabilization feedback circuit for LEDs of one color, sample and hold 500, comparator 502, and power supply 504 provide a stabilization feedback circuit for LEDs of a second color, and sample and hold 506, comparator 508 and power supply 510 provide a stabilization feedback circuit for LEDs of a third color. In the stabilization feedback circuits, the reference voltage used by comparators 240, 502 and 508 can be different for different LEDs.

Under most embodiments, detectors 231, 232, and 233 are selected so that they will each detect light from a different one of the colored LEDs. For example, if red, blue and green LEDs were found in LED array 202, detector 231 would detect red light, detector 232 would detect blue light and detector 233 would detect green light. Under some embodiments, these detectors are specifically selected to match the LEDs of LED array 202, in that they are formed using the same technology as the LED to which they are matched. In other embodiments, the only difference between the detectors is the use of a different filter before the actual detector so that the particular wavelength of light for a particular LED can be selected.

Figure 6:
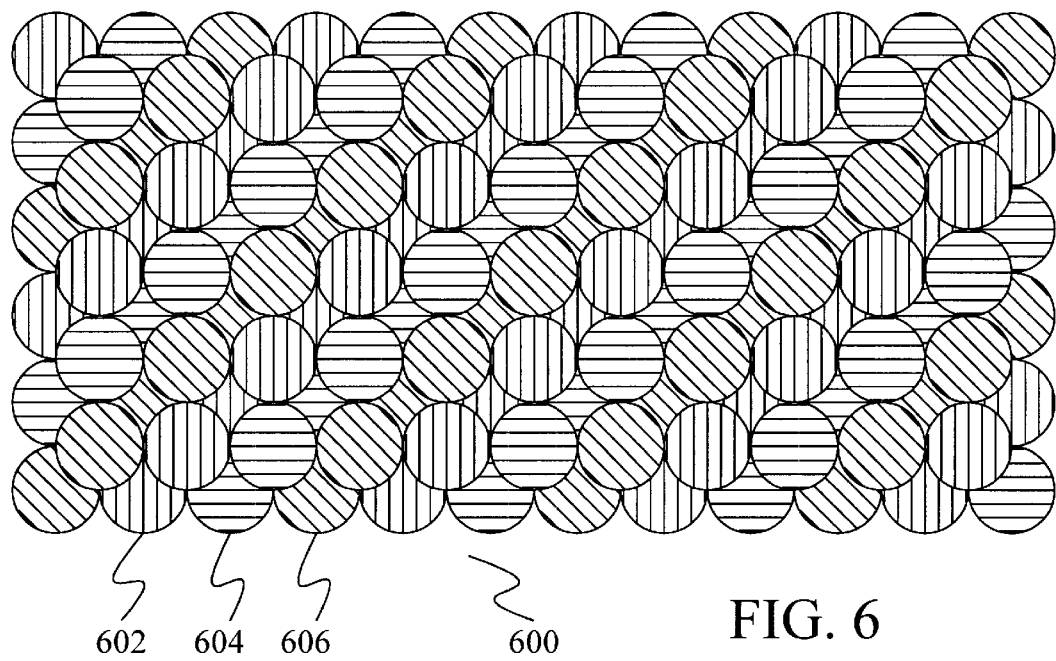
FIG. 6 is a top view of an LED array under a second embodiment of the present invention.

FIG. 6 shows a layout for LEDs in an LED array in one embodiment of the present invention in which different colored LEDs are provided in the LED array. In particular, LED array 600 of FIG. 6 includes red LEDs, blue LEDs and green LEDs as exemplified by red LED 602, blue LED 604, and green LED 606. In FIG. 6, red LEDs are shown with vertical hatching, blue LEDs are shown with horizontal hatching, and green LEDs are shown with diagonal hatching. Although an equal number of each LED is shown in the embodiment of FIG. 6, in other embodiments, different colors will have different numbers of LEDs in the LED array based on the intensity of the light provided by each LED.

In summary, a method of testing the fly-height of a slider 214 includes generating light 204 from an array of light emitting diodes 202 and directing the light 204 so that it reflects off the slider 214 and a transparent disc 212, over which slider 214 is flying. The amplitude of at least one wavelength of light in reflected light 224, 226 from the slider 214 and the disc 216 is detected. This amplitude is then used to calculate the distance between the slider 214 and the disc 212.

In other embodiments of the invention, a fly-height tester 200 includes a moving medium 212 and a slider mount 220 that holds a slider 214 in proximity with medium 212 so that slider 214 flies relative to medium 212. At least one light emitting diode 202 generates light 204, that is directed by first optics 206, 208, and 210 so that it reflects off is medium 212 and slider 214. The reflected light 224, 226 is directed by second optics 210, 208, 230 to at least one detector 231, 232, 233, where each detector is capable of generating an electrical signal 234, 235, 237 based on the amplitude of at least one wavelength of light in the reflected light 224, 226. A distance calculator 236 then determines the distance between slider 214 and medium 212 based on the at least one electrical signal 234, 235, 237.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the interferometer while maintaining substantially the same functionality without departing from the scope and spirit of the present invention. In addition, although the preferred embodiment described herein is directed to a fly-height tester for a slider in a disc drive system, it will be appreciated by those skilled in the art that the teachings of the present invention can be applied to other systems, like tape-drive or optical drive systems, without departing from the scope and spirit of the present invention.

What is claimed is:

1. A method of testing the fly-height of a slider for disc drive the method comprising steps of:
   (a) flying the slider over a transparent disc;
   (b) generating incoherent light from an array of light emitting diodes comprising two stacked levels of light emitting diodes;
   (c) directing the light so that it reflects off the disc and the slider to thereby produce reflected light;
   (d) detecting the amplitude of at least one wavelength of light in the reflected light; and
   (e) calculating the distance between the slider and the transparent disc from the amplitude of the at least one wavelength of light.

2. The method of claim 1 wherein generating step (b) comprises generating light from an array of light emitting diodes that produce white light.

3. The method of claim 2 wherein generating step (b) further comprises using the amplitude of at least one wavelength of light in the reflected light to set the intensity of the light produced by the light emitting diodes.

4. The method of claim 1 wherein generating step (b) further comprises generating light from an array of light emitting diodes that comprises at least two types of diodes, each type of diode being capable of generating a different wavelength of light.

5. The method of claim 4 wherein the array of diodes comprises three types of diodes.

6. The method of claim 5 wherein detecting step (d) comprises detecting the amplitudes of three wavelengths of light in the reflected light each of the three wavelengths having been generated by a separate type of light emitting diode in the array of diodes.

7. The method of claim 6 wherein generating step (b) further comprises using a detected amplitude of a wavelength of light produced by a type of light emitting diode in the array of diodes to control the intensity of light emitted by that type of light emitting diode.

8. A fly-height tester for testing the fly height of sliders used in storage devices, the tester comprising:
   a moving medium;
   a slider mount for holding the slider in proximity to the moving medium such that the slider flies relative to the medium;
   an array of light emitting diodes that are stacked on two levels for generating incoherent light;
   first optics for directing the light so that it reflects off the moving medium and the slider to form reflected light;
   second optics for directing the reflected light to at least one detector, each detector being capable of generating an electrical signal based on the amplitude of at least one wavelength of light in the reflected light; and
   a distance calculator that calculates the distance between the slider and the moving medium based on at least one electrical signal generated by the at least one detector.

9. The fly-height tester of claim 8 wherein the array of light emitting diodes comprises diodes that generate a broad spectrum of light wavelengths.

10. The fly-height tester of claim 8 wherein the array of light emitting diodes comprises at least two different colors of light emitting diodes.

11. The fly-height tester of claim 10 wherein the array of light emitting diodes comprises three different colors of light emitting diodes.

12. The fly-height test of claim 11 wherein the at least one detector comprises three different detectors, each detector designed to detect a different color of light produced by a different color light emitting diode.

13. The fly-height tester of claim 8 further comprising a feedback circuit for controlling the intensity of the light produced by the at least one light emitting diode based on at least one electrical signal produced by at least one detector.

14. The fly-height tester of claim 13 wherein the at least one light emitting diode comprises an array of colored light emitting diodes, the array having three different colors of light emitting diodes.

15. The fly-height tester of claim 14 wherein the at least one detector comprises three detectors, each detector being capable of generating an electrical signal based on the amplitude of a different color of light.

16. The fly-height tester of claim 15 wherein the feedback circuit comprises three separate feedback circuits, each separate feedback circuit for controlling the intensity of the light produced by one of the colors of light emitting diodes based on an electrical signal produced by at least one detector.

17. A fly-height tester, for testing the fly-height of a slider relative to a medium, the fly-height tester comprising:
    a slider mount for positioning the slider proximate the medium; and
    interferometer means for generating light using an array of light emitting diodes stacked on two levels, reflecting the light off the slider and medium to produce reflected light, detecting the reflected light and calculating a distance between the slider and the medium based on the reflected light.

18. A method of testing the fly-height of a slider for a disc drive, the method comprising steps of:

(a) flying the slider over a transparent disc;

(b) generating incoherent light from an array of light emitting diodes comprising at least a first type of diode and a second type of diode, each type of diode being capable of generating a different wavelength of light;

(c) directing the light so that it reflects off the disc and the slider to thereby produce reflected light;

(d) detecting the amplitude of each wavelength of light in the reflected light;

(e) using the amplitude of the wavelength of light produced by the first type of diode to control the intensity of light emitted by the first type of diode;

(f) using the amplitude of the wavelength of light produced by the second type of diode to control the intensity of light emitted by the second type of diode; and (g) calculating the distance between the slider and the transparent disc from the amplitude of at least one wavelength of light.

19. A fly-height tester for testing the fly height of sliders used in storage devices, the tester comprising:

a moving medium;

a slider mount for holding the slider in proximity to the moving medium such that the slider flies relative to the medium;

at least two types of light emitting diodes, each type of light emitting diode generating incoherent light of a different wavelength;

first optics for directing the light so that it reflects off the moving medium and the slider to form reflected light;

second optics for directing the reflected light to at least two detectors, each detector being capable of generating an electrical signal based on the amplitude of a different wavelength of light in the reflected light;

at least two feedback circuits, each for controlling the intensity of the light produced by one of the at least two types of light emitting diodes based on an electrical signal generated by one of the detectors; and a distance calculator that calculates the distance between the slider and the moving medium based on at least one electrical signal generated by the at least one detector.

* * * * *

UNITED STATES PATENT AND TRADEMARK OFFICE
CERTIFICATE OF CORRECTION

PATENT NO. : 6,624,892 B1
DATED : September 23, 2003
INVENTOR(S) : Johnston

It is certified that error appears in the above-identified patent and that said Letters Patent is hereby corrected as shown below:

<u>Title page,</u>
Item [73], Assignee, "Seagate Technolgy LLC" should be
-- Seagate Technology LLC --

<u>Column 5,</u>
Line 35, replace "drive the method comprising" with -- drive, the method comprising --
Line 63, replace "reflected light each of the three" with -- reflected light, each of the three --

Signed and Sealed this

Twenty-third Day of March, 2004

JON W. DUDAS
*Acting Director of the United States Patent and Trademark Office*